United States Patent [19]

Conti

[11] 4,080,599
[45] Mar. 21, 1978

[54] MEMORY ADDRESSING APPARATUS AND METHOD

[75] Inventor: Robert A. Conti, Greenbelt, Md.

[73] Assignee: Westinghouse Electric Corporation, Pittsburgh, Pa.

[21] Appl. No.: 709,472

[22] Filed: Jul. 28, 1976

[51] Int. Cl.² ............................................. G01S 7/44
[52] U.S. Cl. ................................. 343/5 DP; 364/900
[58] Field of Search ................... 343/5 DP; 340/172.5

[56] References Cited

U.S. PATENT DOCUMENTS 3,633,173  1/1972  Edge ............................ 343/5 DP X Primary Examiner—T.H. Tubbesing
Attorney, Agent, or Firm—H. W. Patterson

[57] ABSTRACT

An improved corner turn memory addressing system and method for radar wherein digital data corresponding to the reflected value of each radar pulse for successive range gates is written in sequence, and such digital data for each range gate for succesive radar pulses is read out, in sequence, is disclosed. As each data item is read out of a selected address of a memory, a new received data item is written into the same address. A single data value is summed with each previous address to determine the subsequent address for each data item of a single radar "look". A repetitive series of different data values is used for successive radar "looks". When the sum of the added value and the previous address equals or exceeds the total number of data items for each "look", such sum has subtracted therefrom a data value corresponding to (N × M − 1) to determine the next address, where N is the number of range gates and M is the number of radar pulses for each radar "look".

8 Claims, 6 Drawing Figures

MEMORY ADDRESSING APPARATUS AND METHOD

BACKGROUND OF THE INVENTION

The present invention relates to a method and apparatus for addressing a random access memory.

In a typical radar system generally referred to at 15 such as shown in FIG. 1, a radar transmitter 16 transmits trains of pulses to an antenna 17. The antenna 17, which may scan either incrementally or continually, aims each train of pulses in a specific direction successively. Each specific direction or aim of the antenna 17 is commonly termed a "look". Thus, a train or series of a predetermined number of pulses is transmitted for each radar "look". The reflected transmitted pulses for each "look" are sensed by the antenna, and amplified by a receiver 18. The first signal received for each "look" is reflected from the target closest to the radar antenna 17, while the later pulses are reflected from targets farthest from the antenna 17. Each amplified reflected signal is converted to a digital number which corresponds to the amplitude or other characteristic of the pulse which is indicative of a target or a lack thereof. For each reflected pulse, the receiver generates a sequence of numbers corresponding to the number of ranges of distance for a particular radar application. Each one of these numbers or data items is termed a "range gate". Thus, when a pulse is transmitted, the numbers are generated for adjacent range gates for such pulse prior to the generation of each succeeding pulse. Thus, for the first pulse of each series, the strength of the reflected pulse at a particular time may indicate a target for any one of the range gates. These data items are input to a memory apparatus 20, to a signal processor 21 and then to a display or control unit 22 for indication of targets or other uses where it is desired to know the presence and distance of a target from the antenna 17 for each "look", for example.

If a target could be detected accurately with one transmitted pulse for each "look", it is apparent that the signal processor 21 could receive each sequence of data items corresponding to range gates, and determine the distance of the target from the radar. However, for accurate detection it is necessary to transmit a series of pulses for each "look". Therefore, the receiver 18 outputs each sequence of range gate data numbers after the transmission of each pulse of the series in sequence. In other words, target information for the various range gates is output by the receiver for the first pulse of a "look" which is followed by the range gate information for the second pulse of the same "look", and finally the range gate information for the final pulse of the "look" is output. However, in order to properly process the range gate information for the pulses of each radar look, it is necessary that the signal processor 21 receives the data items for each range gate in succession for all of the radar pulses transmitted during a particular look. In other words, the signal processor 21 should receive in sequence, data items relating to a first range gate for all of the pulses of a particular look, then data items relating to a second range gate for all of the pulses of such look, and finally the data items for the final range gate for all of such radar pulses of such look.

Assume, for example, and for the sake of simplicity of explanation, that a series of five radar pulses are transmitted for each antenna "look" and that there are three range gates for each radar pulse, then the memory apparatus 20 receives and transmits 15 data items for each "look". If the 5 pulses of each "look" are designated 0, 1, 2, 3, and 4; and each range gate is designated as A, B, and C, the 15 data items are received by the memory apparatus 20 in the following sequence: 0A, 0B, 0C, 1A, 1B, 1C, 2A, 2B, 2C, 3A, 3B, 3C, 4A, 4B, and 4C. However, to properly process such information, the signal processor 21 should receive such data items for all of the pulses of the look for each range bin in sequence; that is, the sequence of inputs to the signal processor should be 0A, 1A, 2A, 3A, 4A, 0B, 1B, 2B, 3B, 4B, 0C, 1C, 2C, 3C, and 4C. In this latter output sequence from the memory apparatus 20, the signal processor 21 receives the results of all 5 pulses from the range inteval or gate A, then all 5 pulses from the ranges interval, B, and all 5 pulses from the range interval C. The memory apparatus 20 rearranges such data items; and is typically termed a corner turn buffer or memory.

The problem of rearranging and reading out such data items is relatively simple provided that the data of the corner turn memory apparatus can be read out completely for on "look" prior to the writing in of the data for the next "look". However, since radar systems are continually transmitting and receiving reflected pulses, there is insufficient time for such complete read-outs to occur before the next write-in. Heretofore, in radar applications, it was necessary to utilize what is termed a double buffer corner turn memory apparatus, which utilizes two separate memory arrays. While the data is being written into the first buffer in one sequence, it is being read out of the second buffer in the proper sequence. Then the buffers are switched so that the data items are being read out of the first buffer while new data items are being written into the second buffer. Such an arrangement, although satisfactory, requires double the amount of memory hardware required. Heretofore, attempts to utilize a single buffer or memory apparatus such as referred to at 23 that is structured to read out the data items from one radar "look" simultaneously with the writing in of the data items from the next "look" resulted in a complicated addressing arrangement or circuitry that required more apparatus than the conventional double buffered corner turn memory.

Therefore, it is desirable to provide an improved single corner turn buffer 23 as shown in FIG. 1 and method suitable for radar applications that has the necessary speed of operation corresponding to the double buffer corner turn memory while utilizing a relatively simple method and address circuitry 24 therefor.

SUMMARY OF THE INVENTION

The present invention relates to a system and method for reading out data items of a series of data sets in a predetermined sequence different from the sequence that such data items are received, requiring a memory or storage device that has a total number of individual data item memory cells no greater than the number of data items of each data set. As each data item of one data set is read out of its memory cell in the predetermined sequence, a data item of the next data set is written into the empty memory cell in its write-in sequence. A single predetermined data value (NK) is summed with each previous address designation to determine the next address designation for each data item of the adjacent data sets that are being read out and written into the memory device. Whenever the sum of such data value (NK) and the designated address is equal to or greater than the total number of data items in a data set the same predetermined value, which is used for every data set, is subtracted from such sum to obtain such next designated address of the adjacent data sets. A repetitive sequence of predetermined data values (NK) is utilized for successive adjacent data sets, the value of each, the number of different data values (NK), and the particular sequence of such data values depend on the number of data items and the desired read-out arrangement.

More specifically, the present invention relates to an improved system and method for outputting to a radar digital signal processor, a sequence of range information for a plurality of transmitted radar pulses during each of repetitive radar looks, where a data item corresponding to each range is received in sequence for each transmitted radar pulse in turn by the system, and a data item corresponding to each transmitted pulse is required to be output in sequence for each of the ranges in turn. The system requires a memory or storage device having a total number of memory cells no greater than a data set (N × M) where for each antenna look, N is the number of radar pulses transmitted, and M is the number of ranges. As each data item is output from its respective memory cell in the predetermined sequence for one antenna look, the corresponding data item in the write-in sequence for the next antenna "look" is stored in the empty memory cell. Addressing means is provided that sums a predetermined value (NK) with each designated address to determine the next succeeding designated address for each data item. Such value is the same for each of the data items of a single look. When the sum of the predetermined data value (NK) and the designated address equals or exceeds the total number of data items in a data set, a single predetermined value, which is utilized for all the data sets, is subtracted therefrom to obtain the proper address. The predetermined values (NK) which are summed with each designated address are repetitive in a sequence depending on the number of pulses and ranges during each antenna look. In the embodiment where the first predetermined value of each repetitive sequence is 1, the single value that is subtracted from the sum of a previous address and NK that equals or exceeds the total number of data items to obtain the next address corresponds to (N × M − 1).

DESCRIPTION OF THE PREFERRED EMBODIMENT

Figure 1:
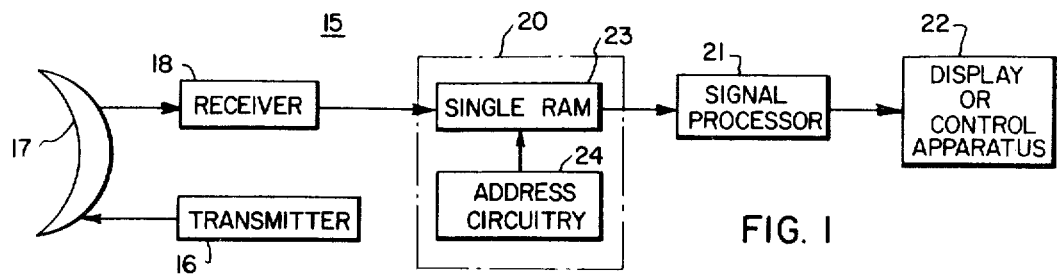
FIG. 1 is a general schematic block diagram of a typical radar system incorporating a single corner turn apparatus.

Referring briefly, to FIG. 1, the radar system 15 as briefly described in the Background of the Invention, includes the antenna 17 and a conventional radar transmitter 16 for transmitting pulses at a predetermined rate thereto. The antenna 17 may move incrementally or steadily during the transmission of a predetermined number of these radar pulses for a predetermined distance, thus beaming the pulses in a predetermined direction. The direction in which the antenna 17 is facing during the transmission of this predetermined number of pulses (hereinafter referred to as N) is termed a radar look. Typically, each of the pulses is transmitted a certain time distance apart so that the antenna 17 or another antenna may receive an indication of a target that exists in a certain predetermined number M of range gates or distances from the radar antenna. Thus for each look, the pulses are received by a conventional receiver 18 in the sequence in which they are transmitted. However, subsequent to the transmission of each pulse, the receiver has a conventional timing gate for the detection of a reflection at discrete times between each radar pulse. These times are referred to as range gates. The receiver includes an analog-to-digital converter, which may be of any well-known suitable type to convert the value of any such signal during these discrete time intervals or range gates to a digital value.

A corner turn memory apparatus contained within the dashed lines referred to as 20, is utilized to rearrange the information relating to the received digital values in an order that can be utilized by a conventional signal processor 21. The corner turn memory apparatus 20 of the present invention includes a single random access memory or linear array 23 of any well-known type that has a sufficient number of memory cells to accommodate the number of data items for each radar look; that is, the number of range gates for all of the pulses transmitted during each look. The display or control apparatus 22 utilizes the information from the signal processor 21. Address circuitry 24 provides for designating the address in the memory device 23 for writing in the data item of one radar look, and reading out each data item of the preceding radar look in the proper order.

Figure 2:
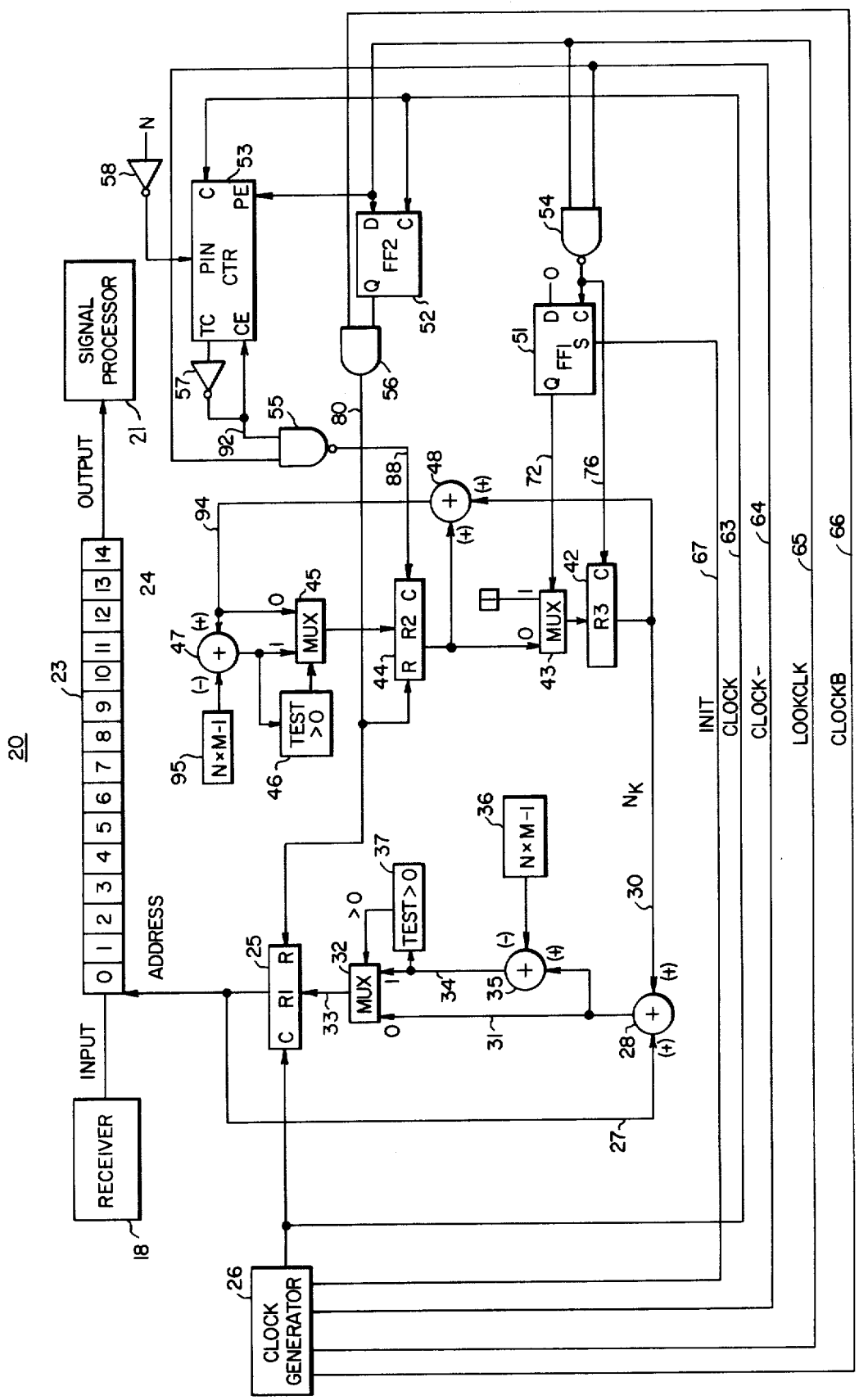
FIG. 2 is a schematic diagram to illustrate the single corner turn apparatus and circuitry in accordance with one embodiment of the present invention.

Referring to FIG. 2, the buffer or memory array 23 of the cornner turn hardware 20 has a plurality of memory cells or elements bearing addresses designated from 0 to 14. The designated addresses of the 15 sequential memory cells for the memory array 23 have been designated as 0 through 14 inclusive for simplicity of description. The memory array 23 is capable of outputting data items and inputting data items at selected memory cell locations in a random manner. Thus, the memory device 23 is capable of accepting data items from the receiver 18 in any selected address in sequence and providing an output such data items to signal processor 21 from such selected addresses in a well-known manner.

The addressing circuitry 24 includes a register 25 which is operated by a clock 26 so that each item that is read out of the memory 23 is followed by the writing in of the incoming data item to the same address. The address appearing on line 27 is summed by a conventional summing device 28 with a predetermined value, hereinafter referred to as $N_k$ on line 30 to generate the address for the next data item that is input from the receiver 18 as hereinafter described. The address for the next data item on the line 31 at the output of the adder 28 is input to a conventional multiplexer 32, then output on line 33 to the register 25. The multiplexer 32 has a second input 34, over which the address at the output of the adder 28 is conducted via an adder 35 when the designated address on line 31 is greater than the highest designated address $N \times M - 1$. The adder 35 subtracts a number or value corresponding to the total data items in a set or look less 1, $(N \times M - 1)$ which value is represented by block 36, from each address value appearing at the output of the adder 28. When such address value appearing on the line 34 at the output of the adder 35 is greater than 0 as determined by a conventional test or comparison device 37, the output of the multiplexer, switches to the value appearing on the input 34 for loading into the register 25 as the next proper address.

The value $N_k$ which appears on the line 30 is a repetitive sequence of predetermined numbers depending on the number of radar pulses (M) transmitted during each look and the number of range gates (N) for each reflected pulse in accordance with a particular radar system. Such value is the same for the concommitant data items being written in and read out of the present and next radar "look" respectively.

This sequence of numbers $N_k$ is generated by circuitry which includes a register R3 referred to at 42, multiplexer 43, register R2 referred to at 44, multiplexer 45, test comparator 46, and summing devices 47 and 48. The signals or inputs required to operate these devices are generated by flip-flop circuits FF1 referred to at 51 and FF2 referred to at 52 together with a counter 53, and gates 54, 55, 56, 57, and 58.

Figure 3:
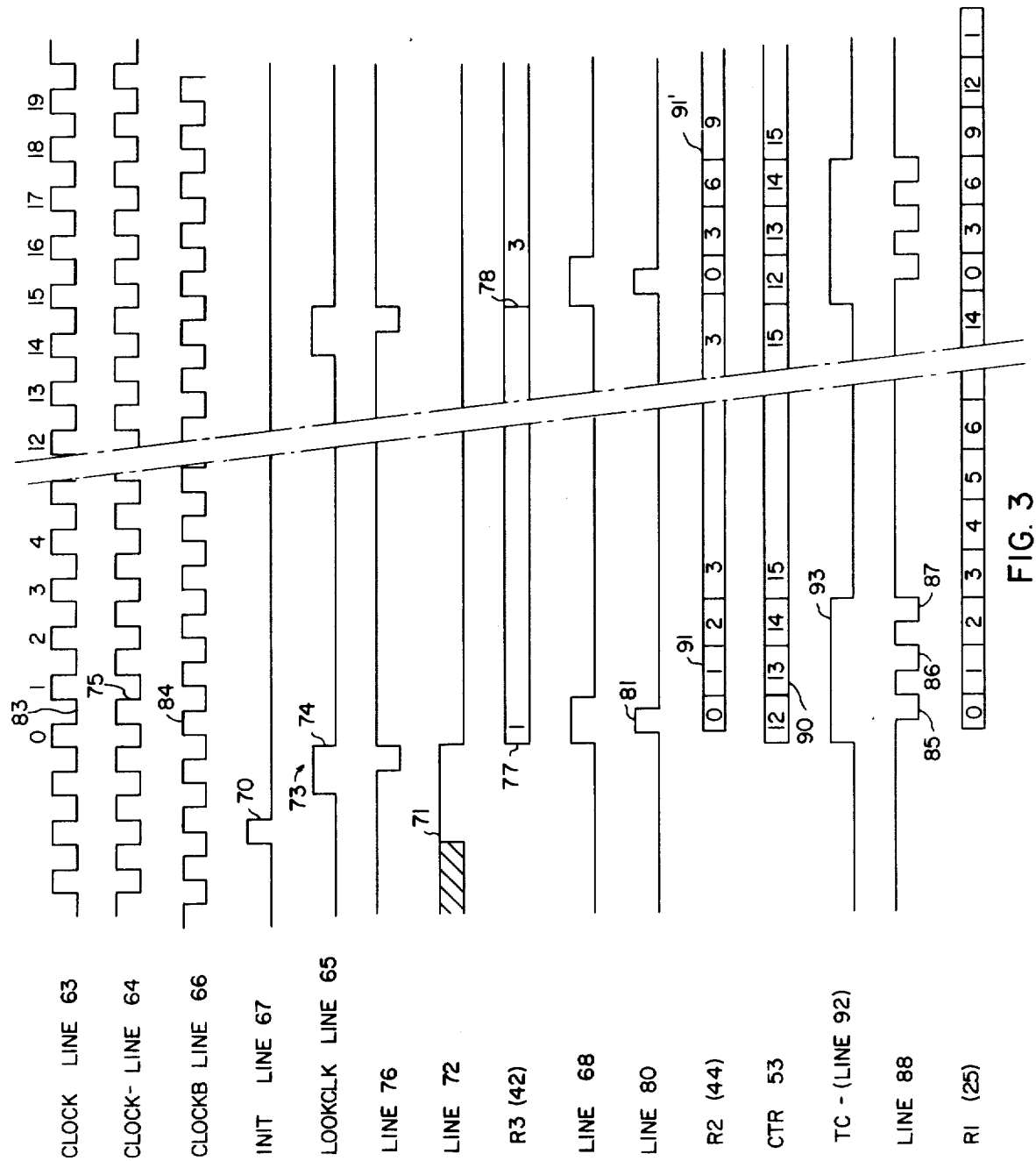
FIG. 3 is a timing diagram illustrating the operation of the embodiment of FIG. 2.

A detailed description of the address circuitry for operating the memory 23 will be given in connection with its operation and with reference also to the timing diagram of FIG. 3. The clock generator 26 provides output pulses on lines 63, 64, 65, and 66 as shown by the similarly designated lines of FIG. 3. A single pulse occurs on line 67 when the system is initially turned on. The generation of these signals, which are identified as CLOCK, CLOCK-, LOOKCLK, CLOCKB, and INIT, occurs in a conventional manner.

When the system is turned on, a pulse 70 occurs on line 67 which operates the flip-flop 51 to produce a characteristic output 71 on line 72 for operating the multiplexer 43 to input a value 1 on the register 42. The clock generator then generates a pulse 73 on the line 65 to indicate the start of a radar lood or data set. As the pulse 73 on line 65 terminates coincidentally with the termination of a pulse on the line 64, represented by 74 and 75 of FIG. 3, the NAND gate 54 generates an output on line 76, which loads the value 1 into the register 42. This value 1 represents the $N_k$ for the first look or data set as represented by the portion of the timing diagram for register 42 between lines 77 and 78. The falling edge 74 of the pulse 73 also operates the flip-flop 51 to terminate the pulse 71 on line 72 to thereafter during the continued operation of radar system cause the multiplexer 43 to select its input 0 from the output of the register 44. Also during this initial period, the registers 25 and 44 are set to zero via a output on line 80 from the AND gate 56 as represented by pulse 81. This is caused by the delay of the termination of the pulse 73 one clock time after it rises while a clock pulse on line 63 is terminated as represented by portion 83 and the presence of a portion of pulse 84 from line 66 during this period. The flip-flop 52 is first set to produce an output on terminal Q to the AND gate 56 in response to a pulse on line 63 which causes the D input to load a value on line 65, and the AND gate 56 conducts upon the occurrence of the pulse 84. Thus flip-flop 52 serves to generate a delayed LOOKCLK. Thus, the registers 42 and 44 are reset to zero upon the beginning of each data set or radar look.

The counter 53 is loaded during the presence of the pulse on the line 65 with the inverse of the number N which is generated by NOT gate 58, and counts to its terminal count through NAND 55 which produces pulses 85, 86, and 87 on line 88. These pulses clock the register 44 N times, which in the present embodiment is three at the beginning of each radar look or data set. This clocking of the register N times, three in this instance, determines the value $N_k$ for obtaining the proper sequence of addresses for reading out the data items of the data set stored in the memory 23 and writing in the data items for the next data set or radar look. The portion of the diagram of FIG. 3 referred to at 90 represents the attainment of the terminal count of the counter at the beginning of each data set, while the timing diagram portion 91 shows the operation of the register 44 in response thereto for determining the next value of $N_k$, which in this embodiment is three, for example. When the terminal count is reached, the output on TC changes from "1" to "0" as shown by line portion 93. This change prevents more than the predetermined number of count pulses on line 92 to be passed by the NAND gate 55 for operating the register 44. The duration of the output on the line 92 is shown by portion 93 of the timing diagram of FIG. 3.

Thus, for the present embodiment where the value $N_k$ is a repetitive sequence of values 1, 3, 9, 13, 11, 5, the register 44 resets and clocks three times during the beginning of each write-in read-out sequence to determine the value $N_k$ on the output of the register 44 on the line 30 for the next write-in read-out sequence. While the memory device is being loaded with the first write-in sequence when the system is turned on, the $N_k$ value of 3 is calculated during the first four data items being processed by placing in the register 44 the sum of the $N_k$ value of 1 and the value in the register 44 by the summing device 48. This sum is introduced through zero input of the multiplexer 45. Thus, for the first four clockings of the register 44, the next $N_k$ value is calculated 0, 1, 2, 3, as shown by portion 91 of the diagram of FIG. 3. While the $N_k$ value of 3 is output from the register 42 on line 30, the next $N_k$ value is calculated by the register 44 through the summing devices 47 and 48 and the multiplexer 45 during the first four data item sequences as 0, 3, 6, 9 as shown by portion 91' of FIG. 3.

In this instance, upon the resetting of the register 44, there is a zero in register 44 and an $N_k$ value of 9 at the output of the register 42. Upon the next clock pulse, there is a value of 9 in register 44 and an $N_k$ value of 9 at the output of register 42. This value of 18 which is accumulated by the adder 48 has now subtracted therefrom by the adder 47 over line 94 the value $(N \times M - 1)$ or 14 from block 95; and inasmuch as the difference of 4 is greater than zero as provided by the test or comparator block 46, a value of 4 is placed in the register 44 by the multiplexer 45 through its input 1. Upon the next clock pulse, the value of 4, which is in the register 44, is summed with the $N_k$ value of 9 at the output of the register 42, wherein the value 13 appears on the line 94. When the $(N \times M - 1)$ value of 14 is subtracted therefrom, the result is less than zero, and thus the value 13 is placed in the register 44 over the input zero of the multiplexer 45. Therefore, the resetting and clocking of the register 44 placed the values 0, 9, 4, 13 therein sequentially so that the value 13 is now ready as the $N_k$ value for the next data set. At the beginning of the next data set, the register 44 has 0 therein and the $N_k$ value is 13. Since the accumulated value is less than (N × M − 1) or 14, the value 13 is placed in the register 44 on the first clock pulse after reset. On the next clock pulse, the value 13 in register 44 is summed with the $N_k$ value of 13 which produces a value of 26 to the input of the summing device 47. The difference between this value and the value (N × M − 1) is 12, which is placed in the register 44 by the multiplexer 45 over its input 1 because the sum is greater than zero. During the next clock pulse, the value 12 in the register is summed again with the $N_k$ value of 13. This value when (N × M − 1) is subtracted therefrom is 11, which is the next proper $N_k$ value. Thus, during the writing-in of the fourth data set, the register 44 is reset and the values 13, 12, 11 are calculated in sequence during the first four data items of the write-in and read-out sequence. When the $N_k$ value is 11, during the first four pulses for the write-in and read-out the register 44 calculates 0, 11, 8, 5 in sequence to obtain the next $N_k$ value of 5 in the same manner as previously described. When the $N_k$ value is 5, the register 44 calculates in sequence 0, 5, 10, 1 to obtain the first $N_k$ value of 1 for the next repetitive sequence of $N_k$ values. Thus, after the pulse occurs on LOOKCLK line 65, the value $N_k$ to be used during the next look is placed in the register 44 and holds such value until it is needed in the register 42. At the beginning of the next look, the value held in the register 44 is clocked into the register 42 and used to compute each address on the line 27 as previously described.

Figure 4:
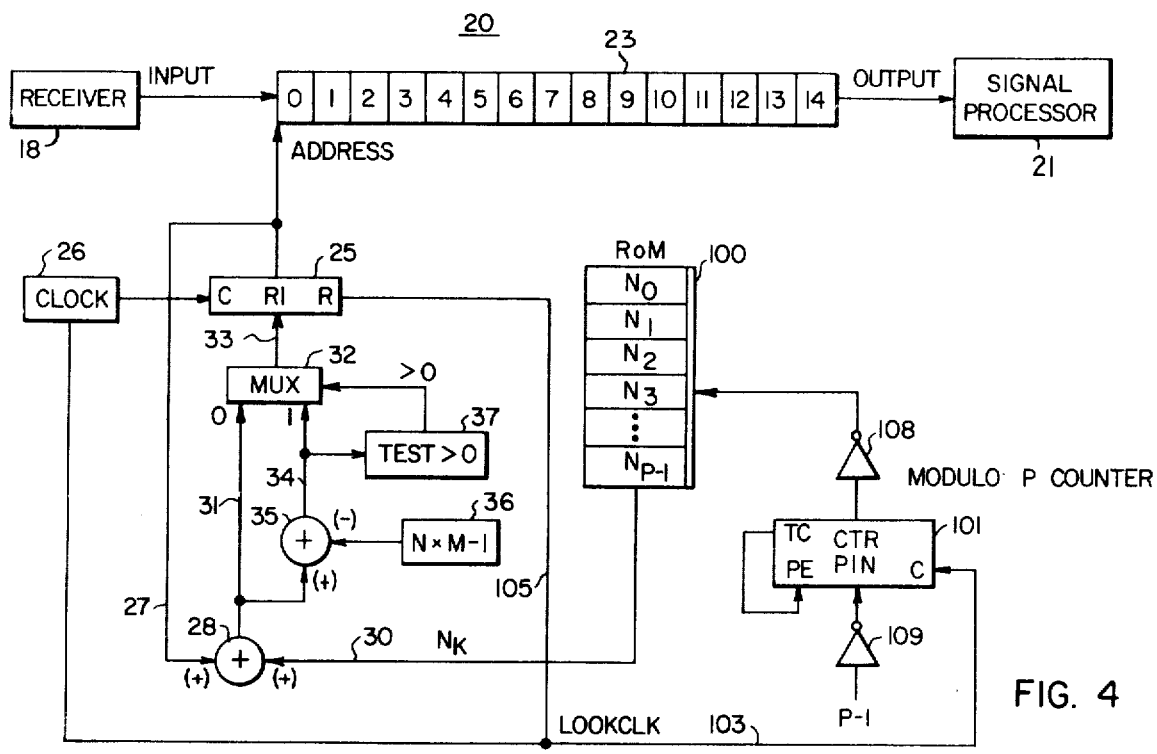
FIG. 4 is a schematic block diagram of an alternate embodiment of the addressing circuitry of the present invention.
Figure 5:
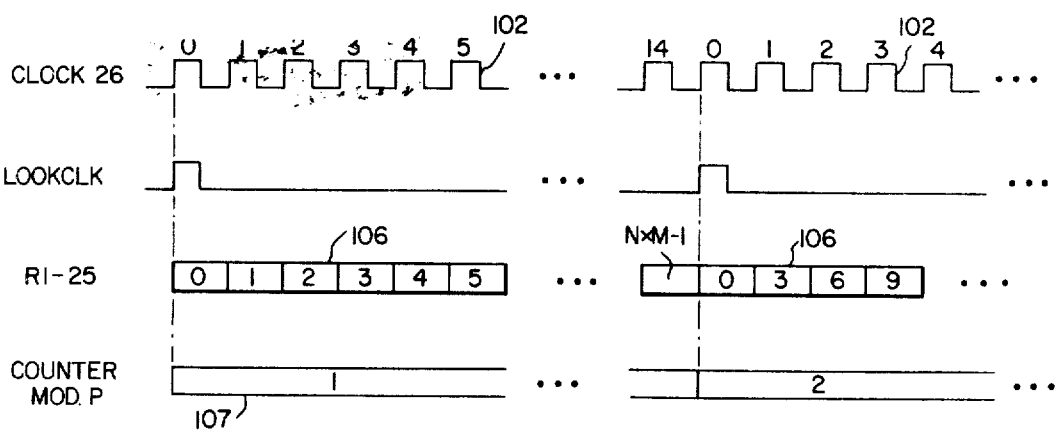
FIG. 5 is a timing diagram illustrating the embodiment of FIG. 4.

Referring to FIG. 4, which shows an alternate embodiment of an addressing system, which differs in the means for selecting the values $N_k$, similar reference characters are used with respect to those components which are identical to FIG. 2, and such embodiment is described in connection with the timing diagram of FIG. 5. The register 25 determines the address for outputting and inputting each data item in accordance with the output of the multiplexer 32 in the same manner as described in connection with FIG. 2. Also, each subsequent address is determined by adding a value $N_k$ to the preceding address by the adder 28; and when such value exceeds the highest designated address, a value (N × M − 1) is subtracted from such value. The use of the value $N_k$ to generate the next address from the preceding address is as described in connection with the embodiment of FIG. 2.

However, the manner of providing the sequence of values $N_k$ which are summed with the preceding address by the adder 28 differs in that a read-only memory 100 has each of the values $N_k$ stored therein. A counter 101, which is operated by the clock 26, causes such values $N_k$ to be output on the line 30 for each subsequent data set or lock in sequence. The number of data sets prior to the repetition of such sequence of values $N_k$ is termed P. Thus, the read only memory 100 repeats itself after N × M × P data items have been read out. During operation, the clock 26 pulses once for each write-in read-out of a data item in adjacently sequenced radar looks as noted by portions 102 of FIG. 5. At the beginning of each data set or look, the LOOKCLK pulse occurs which resets the register 25 over line 105 as shown by portions 106 of FIG. 5 and operates the counter 101 to count once as shown by portions 107 of FIG. 5 for selecting the next value of $N_k$. The NOT gates 108 and 109 provide for operating the counter 101 to select the values $N_k$ in the ROM 100 in repetitive sequence by gate 109 causing the counter to count from the inverse of N to its terminal count and gate 108 inverting the count so that an address between 0 and P-1 is passed to ROM 100. Inverting the count to counter 101 by gate 108 causes the address to ROM 100 to count down as P-1, P-2, P-3, . . . , 2, 1, 0. Thus $N_o$ must be stored in ROM location P-1, $N_1$ in ROM location P-2, etc. where in general $N_k$ is stored in ROM location P-K-1, where K ranges from 0 to P-1.

Figure 6:
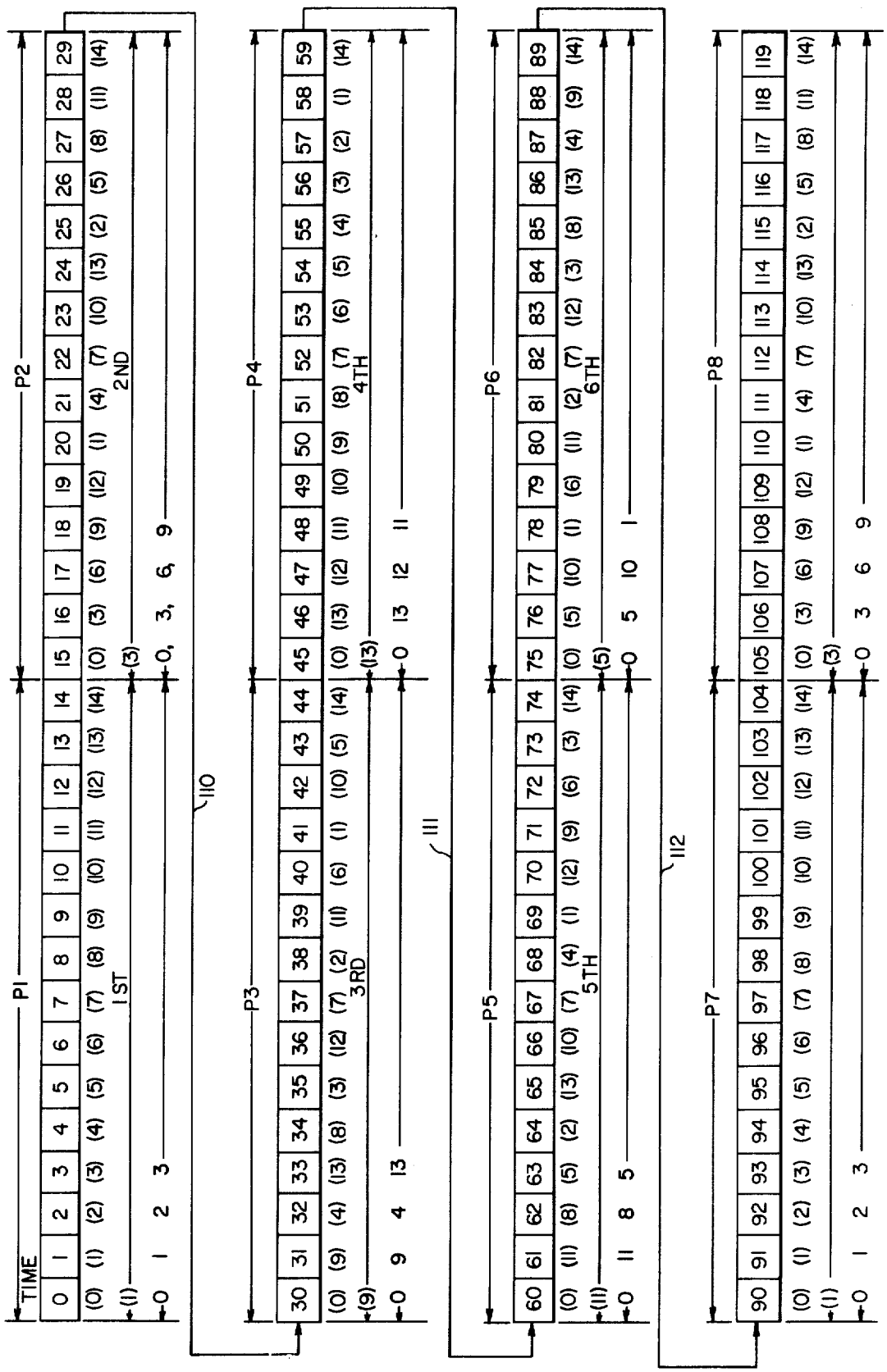
FIG. 6 is a timing diagram to illustrate a typical addressing sequence and values that are added to each previous address during the operation of the embodiment of FIG. 2 for a simplified system having 5 radar pulses with 3 range gates for each radar look.

Referring to FIG. 6, the operation of the device to determine the addresses in the memory device 21 for the simplified example of 5 pulses (M) and 3 range gates (N) may be visualized with respect to the corner turning of 8 consecutive data sets or radar looks. The digits in the elongated blocks commencing at the top of FIG. 6 represent time increments for consecutive data sets. These elongated blocks containing such time digits are connected by lines 110, 111, 112 to indicate that they are continuous from time 0 at the upper left-hand corner of the drawing through time 119 in the lower left-hand corner of the drawing. Initially, it is seen from FIG. 6 that for the data set or look referred to as P1, each data item is addressed in sequence from address 0 through address 14 as represented by the numerals in parentheses below the corresponding time slot of the rectangular boxes during that time period designated as P1. During the look P1, the register 42 adds a value of 1 to each preceding address to get the subsequent address which fills the memory or storage device with each data item sequence from (0) through (14). For looks subsequent to look P1, the value to be transferred into the register 42, but not until the beginning of said subsequent look, is the value at the address of the fourth time digit of the previous look. The value 3, which is at the address of the fourth time digit of P1, is, therefore, transferred to the register 42 at the beginning of look P2. During the data set period P2, the value 3 now present in register 42 is added to each of the preceding addresses to obtain the subsequent address as illustrated. Thus, at the beginning of data set P2 in time slot 15 the (0) cell is addressed to output the data item stored in address 0 during the period P1 and to input the first data item into such address. The next stored data item is read out of address (3) and the next received data item for the data set P2 is written into the same address (3). This adding of (3) to each previous address is continued through time slot 19; but the subsequent time slot P20 would have an address (the number (15)) greater than the highest designated address. Thus, a value corresponding to N × M − 1 which in the present example is 14 is subtracted from the sum of the previous address and the value 3 (which is 15) with the result that the next address is designated as (1). Subsequently, for the next data item of such data set, the value 3 is added to the preceding address (1) to obtain the next address (4) in time period 21 for reading out the data item in address 4 of the data set P1 and writing in the data item of the data set P2 at address (7). When the address (13) is reached, the subsequent address at time 25 is determined by subtracting the (N × M − 1) from the sum of the previous address 13 and the value 3 which corresponds to the address (2). Then the adding of the value 3 continues through the time slot 29 which addresses the address (14) which is the final memory cell of the data set. This same procedure continues through each of the data sets P3 through P6 inclusive, as shown in FIG. 6 by the addition of respective numbers to each preceding address of (9), (13), (11), and (5), respectively. At the beginning of the data set P7, the number value of 1 is again added to each preceding address and the value 3 is added to each succeeding address for the data set P8 of this diagram. This would render apparent the result that succeeding data sets would be properly read out and written in by the addition of the sequence of values (1), (3), (9), (13), (11), and (5).

It is understood that a different sequence of numbers $N_k$ and a great many more numbers $N_k$ in each sequence may be required depending on the number of pulses and range gates for each radar look. For example, if there are six pulses for each radar look with 5 range gates for each pulse, there are 30 data items per set or look. In such case, the sequence of values $N_k$ that is added to successive data sets are (1), (5), (25), (9), (16), (22), (28), (24), (4), (20), (23), (7), and (6). Of course, when the above numbers and the previous address exceed the value ($N \times M - 1$) (in this case (29)), then such value is subtracted from the sum of the previous address and the value $N_k$ to obtain the next address. From the foregoing examples, the addresses required for a particular data set may be determined in one manner by rearranging the data for two of the range gates for example, and noting the value for address of the second item of data in the sequence that follows the address O. It is this address that corresponds to the value $N_k$ for each data set.

Also, in accordance with the foregoing examples, the addresses can be computed by recursive equations as follows:

Terminology Used:

N = number of range gates in each data set

M = number of radar pulses for each data set $A_k(n)$ = the memory address used to write into the array the nth item of the $k'$th data set, where $$0 \leq n \leq N \times M - 1$$

$$0 \leq K \leq P$$

P = period of the data set $N_k$ = a special number used to generate the addresses for the kth data set.

The address for item $n$ of data set K, (i.e., $A_k(n)$), is given in terms of $A_k(n-1)$ by the recursive equation:

$$(1) \; A_k(n) = \begin{cases} (A_k(n-1)+N_k) \bmod N \times M - 1, \\ \quad \text{if } A_k(n-1)+N_k \neq N \times M - 1 \\ N \times M - 1, \text{ if } A_k(n-1)+N_k = N \times M - 1 \end{cases}$$

where, initially, $A_k(O) = 0$, for any $k$ $$N_0 = 1$$

After generating all $N \times M$ addresses by cycling $n$ from 0 to $N \times M - 1$, the value of $N_{k+1}$ is computed as:

$$(2) \quad N_{k+1} = (N_k \times N) \bmod N \times M - 1$$

This value is used to generate addresses $A_{k+1}(0)$ through $A_{k+1}(N \times M - 1)$.

Equation (1) can be further simplified to:

$$(3) \; A_k(n) = \begin{cases} A_k(n-1)+N_k, \text{ if} \\ A_k(n-1)+N_k \leq N \times M - 1 \\ A_k(n-1)+N_k-(N \times M-1), \text{ if} \end{cases}$$

-continued
$$A_k(n-1)+N_k > N \times M - 1$$

Another set of equations (non-recursive for $A_k$ and $N_k$ is:

$$(4) \; A_k(n) = \begin{cases} (n \times N_k) \bmod N \times M - 1, \text{ if} \\ (n \times N_k) \bmod N \times M - 1 \neq 0 \\ N \times M - 1, \text{ if } (n \times N_k) \bmod N \times M - 1 = 0 \end{cases}$$

$$(5) \quad N_k = (N^k) \bmod N \times M - 1$$

Although the system and method is described where the individual memory cells are designated 0, 1, 2, 3, etc., it is understood that such memory cells can be designated in any consecutive numeral sequence while still utilizing the value corresponding to ($N \times M - 1$) for subtracting from the sum of the previous address and the value $N_k$ where such sum is equal to or greater than the number of data items in a data set to obtain the next address of a data set. Also, the sequence of values of $N_k$ can be determined with the utilization of any regular sequence of designated addresses. Should the addresses be consecutively designated by two's, for example, such as 3, 5, 7, 9, etc., then the number subtracted from the sum of the preceding address and the value $N_k$ to get the next address when it equals or exceeds the number of data items corresponds to $2(N \times M - 1)$. It is also understood that with the teachings of the present invention the addressing circuitry can be modified without departing from the spirit or scope of the present invention.

I claim:

1. In a radar system for receiving repetitively individual data items, each of which represents target information at predetermined directions and distances, each predetermined plurality of consecutively received data items constituting target information at said predetermined distances for a plurality of radar pulses during a predetermined interval, a system for rearranging the data items for each predetermined interval, comprising:

means for receiving the data items for each predetermined interval representing each of the predetermined distances for each of the radar pulses in succession;

an addressable memory address for storing each of the data items written therein in a first sequence from the receiving means during predetermined intervals;

a signal processor for reading the stored data items in a predetermined second sequence different from the write-in sequence;

means to select a predetermined sequence of addresses in the memory device, the total number of said selected addresses being no greater than the total number of data items of a predetermined interval, for reading out in the second sequence the data items of one predetermined interval while writing in the first sequence data items of the next predetermined interval, said address selection means including, means to add the same predetermined value $N_k$ to each preceding address of a predetermined interval write-in read-out sequence to determine the next address in such sequence;

means to subtract a predetermined value corresponding to the total number of data items less one in a predetermined interval from the sum of the value $N_k$ and the preceding address at times when said sum is equal to or greater than said total number of data items to determine the next address in such sequence; and means to select a predetermined value $N_k$ for each individual predetermined interval.

2. In a system according to claim 1 wherein the means to select the value $N_k$ for each successive predetermined interval comprises:

means to calculate a first predetermined value $N_k$ for the next predetermined interval during the preceding interval.

3. In a system according to claim 1 wherein the means to select the value $N_k$ for each successive predetermined interval comprises means to generate a first predetermined value $N_k$ during one predetermined interval to determine the $N_k$ value for a second predetermined interval;

means to add the $N_k$ values for the second interval during the write-in read-out sequence of each of a predetermined number of data items during said second predetermined interval to determine the $N_k$ value for a third predetermined interval;

means to detect a sum of the $N_k$ value for each of the predetermined number of data items for the second predetermined interval and the $N_k$ value of each of the predetermined number of data items for the third predetermined interval whenever such sum is at least equal to the total number of data items of each predetermined interval; and means responsive to such detection means to subtract therefrom a value corresponding to the total number of data items less one during each write-in read-out sequence of the predetermined number of data items to determine the $N_k$ value of the third predetermined interval.

4. A system for repetitively rearranging the read-out sequence of the individual data items in each of a plurality of data sets different than the write-in sequence of such data items, comprising:

an addressable memory device having a plurality of individual memory addresses for storing each of the data items of a data set;

means to select a predetermined sequence of addresses in the memory device, the total number of selected addresses being no greater than the total number of selected addresses being no greater than the total number of data items in a data set, said address selection means including:

means to add the same predetermined value $N_k$ to each preceding address of a data item of a data set to determine the next address for the data set;

means to subtract a predetermined value corresponding to the total number of data items less 1 of a data set from the sum of the value $N_k$ and the preceding address at times when said sum is equal to or greater than said total number of data items to determine the next address of the same data set; and means to select a predetermined value $N_k$ for each data set.

5. A system according to claim 4 wherein the means to select the value $N_k$ for successive data sets comprises means to calculate a first predetermined value $N_k$ for one data set in accordance with the value $N_k$ for the preceding data set.

6. A system according to claim 4 wherein the means to select the value $N_k$ for successive data sets comprises:

means to generate a first predetermined value $N_k$ during one write-in read-out sequence to determine the $N_k$ value for a second write-in read-out sequence;

means to sum a predetermined number of $N_k$ values during said second sequence to determine the $N_k$ value for a third sequence;

means to detect an $N_k$ value summation at least equal to the total number of data items in a data set; and means responsive to such detection means to subtract therefrom a value corresponding to the total number of data items less one for each of the selected summations to determine the $N_k$ value for the third sequence.

7. A method of addressing a memory device for reading out data items constituting a data set in a predetermined sequence different from a predetermined write-in sequence of said data items where the data items of one set are being written into the same address while the data items of another data set are being read out, comprising the steps of:

adding a predetermined value $N_k$ to each preceding address to determine the next address for each sequence;

subtracting a predetermined value less than the total number of data items from the resulting sum of the first step at times when said sum is equal to or greater than the number of data items of a data set.

8. A method according to claim 7 wherein the step of subtracting a predetermined value less than the total number of data items includes the step of subtracting a predetermined value equal to the total number of data items less one.

* * * * *

UNITED STATES PATENT AND TRADEMARK OFFICE
CERTIFICATE OF CORRECTION

PATENT NO. : 4,080,599
DATED : March 21, 1978
INVENTOR(S) : R. A. Conti

It is certified that error appears in the above-identified patent and that said Letters Patent are hereby corrected as shown below:

Column 1, after the Title insert the following paragraph:

-- The invention herein described was made in the course of or under a contract or a subcontract with the Department of the Air Force. --.

Signed and Sealed this

Twentieth Day of March 1979

[SEAL]

Attest:

RUTH C. MASON
*Attesting Officer*

DONALD W. BANNER
*Commissioner of Patents and Trademarks*